United States Patent
Schiff

(12) 
(10) Patent No.: US 6,317,420 B1
(45) Date of Patent: Nov. 13, 2001

(54) FEEDER LINK SPATIAL MULTIPLEXING IN A SATELLITE COMMUNICATION SYSTEM

(75) Inventor: Leonard N. Schiff, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/344,818

(22) Filed: Jun. 25, 1999

(51) Int. Cl.$^7$ .................................................. H04Q 11/02
(52) U.S. Cl. ................................................ 370/325; 370/535
(58) Field of Search ............................ 370/315, 316, 370/319, 325, 326, 480, 535

(56) References Cited

U.S. PATENT DOCUMENTS

| | | | |
|---|---|---|---|
| 4,706,239 | * 11/1987 | Ito et al. .............................. | 370/325 |
| 4,901,307 | 2/1990 | Gilhousen et al. . | |
| 4,926,422 | * 5/1990 | Alaria et al. ........................ | 370/323 |
| 5,691,974 | 11/1997 | Zehavi et al. . | |
| 5,835,487 | * 11/1998 | Campanella ......................... | 370/316 |
| 5,920,284 | 7/1999 | Victor . | |
| 6,052,085 | * 4/2000 | Hanson et al. ...................... | 342/373 |

* cited by examiner

*Primary Examiner*—Min Jung
(74) *Attorney, Agent, or Firm*—Philip R. Wadsworth; Gregory D. Ogrod

(57) ABSTRACT

A system and method for spatial multiplexing signals on the feeder links of a satellite communication system. A beamforming antenna forms a plurality of feeder beams from signals received from system gateways, each feeder beam illuminating one of the gateways and including a plurality of frequency division multiple access (FDMA) channels. A plurality demultiplexers separate each of the feeder beams into the FDMA channels, and signal combiners combine first and second ones of the channels, each comprising signals corresponding to user terminals illuminated by a specific user beam, to produce a user beam signal which is used by a beamforming user link antenna to form a specific user beam. In a further aspect, a user link beamforming antenna forms a plurality of user beams from signals received from user terminals, each including a plurality of FDMA channels, and a plurality of demultiplexers separate each of the user beams into the channels. A combiner combines a first and a second one of the FDMA channels, which comprise signals corresponding to a gateway illuminated by a specific feeder beam, to produce a feeder beam signal which is used by a user link beamforming antenna to form a specific feeder beam.

16 Claims, 13 Drawing Sheets

FEEDER LINK SPATIAL MULTIPLEXING IN A SATELLITE COMMUNICATION SYSTEM

BACKGROUND OF THE INVENTION

I. Field of the Invention

The present invention relates to low-Earth orbit (LEO) satellite communication systems. More specifically, the present invention relates to using spatial multiplexing to increase the bandwidth of the communication links between the satellites and the Earth stations in such a system.

II. Related Art

A typical satellite-based communication system comprises at least one terrestrial base station (referred to as a "gateway"), at least one user terminal (for example, a mobile or hand-held portable telephone), and at least one satellite for relaying communication signals between the gateway and the user terminal. The gateway provides links from a user terminal to other user terminals or communication systems, such as a terrestrial telephone system.

One of the limitations imposed on satellite communications systems is the allocated frequency bandwidth. Various governmental agencies and standards associations allocate bandwidth in the total signal spectrum taking into consideration various political and technical constraints. One type of allocation granted for use in Low Earth Orbit satellite based communications systems is granted by the ITU (International Telecommunications Union) and uses a 200 MHz bandwidth. Given the fixed allocation constraints and an extreme unlikelihood of obtaining additional bandwidth, it is desirable to maximize the capacity of this bandwidth allocation, to thereby maximize the number of users who can utilize a given system at any time.

Conventional satellites use one large beam or beamforming antennas on the communication links between the gateway and the satellite (referred to as a "feeder link") and between the satellite and the user terminal (referred to as the "user link"). Typically, a single feeder link is used so that a single path couples each satellite with all gateways within view of the satellite. On the user link side, multiple links divide the coverage area of the satellite (referred to as a "footprint") into a plurality of geographic regions (referred to as "cells"). Each cell is illuminated by one of the user link beams. Each beam uses the full bandwidth allocated to the user link. The resulting bandwidth available for user terminal communication is given by the product of the user link bandwidth and the number of user link beams.

As the demand for such satellite-based communication services increases, so must the capacity of such systems. Given that user bandwidth allocations are at present inflexible, one way to increase the capacity of the user link is simply to increase the number of user link beams. However, any increase in user link capacity must be accompanied by an increase in the capacity of the communication link between the satellite and the gateways.

It is, therefore, desirable to provide a system and method for increasing the capacity of a satellite communications system in which the bandwidth cannot be increased.

SUMMARY OF THE INVENTION

The present invention is suitable for use in a communication system having a plurality of gateways and a satellite that is coupled to the gateways by feeder links and to user terminals by a user link, where the satellite provides a plurality of user beams on the user link.

In one aspect, the present invention provides an apparatus comprising a beamforming antenna that forms a plurality of feeder beams from signals received from the gateways, each feeder beam illuminating one of the gateways and including a plurality of frequency division multiple access (FDMA) channels; a plurality of demultiplexers that separate each of the feeder beams into the FDMA channels; means for combining a first one of the FDMA channels with a second one of the FDMA channels, the first and second FDMA channels comprising signals corresponding to user terminals illuminated by a specific user beam, to produce a user beam signal; and a beamforming user link antenna that forms the specific user beam using the user beam signal.

The user beam signal includes a plurality of frequency bands, and the means for combining comprises a controller that allocates the first and second FDMA channels to the specific user beam and to first and second ones of the user beam signal frequency bands; a first frequency converter that converts the first FDMA channel from the frequency band on which the first FDMA channel was received to the first one of the user beam signal frequency bands; a second frequency converter that converts the second FDMA channel from the frequency band on which the second FDMA channel was received to the second one of the user beam signal frequency bands; a multiplexer that multiplexes the frequency-converted first and second FDMA channels to produce the user beam signal; and a switch that routes the frequency-converted first and second FDMA channels to the multiplexer.

In a further aspect, the present invention provides an apparatus comprising a user link beamforming antenna that forms a plurality of user beams from signals received from the user terminals, each user beam including a plurality of FDMA channels; a plurality of demultiplexers that separate each of the user beams into the FDMA channels; means for combining a first one of the FDMA channels with a second one of the FDMA channels, the first and second FDMA channels comprising signals corresponding to a gateway illuminated by a specific feeder beam, to produce a feeder beam signal; and a user link beamforming antenna that forms the specific feeder beam using the feeder beam signal.

The feeder beam signal includes a plurality of frequency bands, and the means for combining comprises a controller that allocates the first and second FDMA channels to the specific feeder beam and to the first and second ones of the feeder beam signal frequency bands; a first frequency converter that converts the first FDMA channel from the frequency band on which the first FDMA channel was received to the first one of the feeder beam signal frequency bands; a second frequency converter that converts the second FDMA channel from the frequency band on which the second FDMA channel was received to the second one of the feeder beam signal frequency bands; a multiplexer that multiplexes the frequency-converted first and second FDMA channels to produce the feeder beam signal; and a switch that routes the first FDMA channel to the first frequency converter and that routes the second FDMA channel to the second frequency converter.

One advantage of the present invention is that it provides for increased capacity on the feeder link of a communication satellite.

BRIEF DESCRIPTION OF THE FIGURES

The features, objects, and advantages of the present invention will become more apparent from the detailed description set forth below when taken in conjunction with the drawings in which like reference characters identify corresponding elements throughout and wherein.

DETAILED DESCRIPTION OF THE PREFERRED EMBODIMENTS

Figure 1:
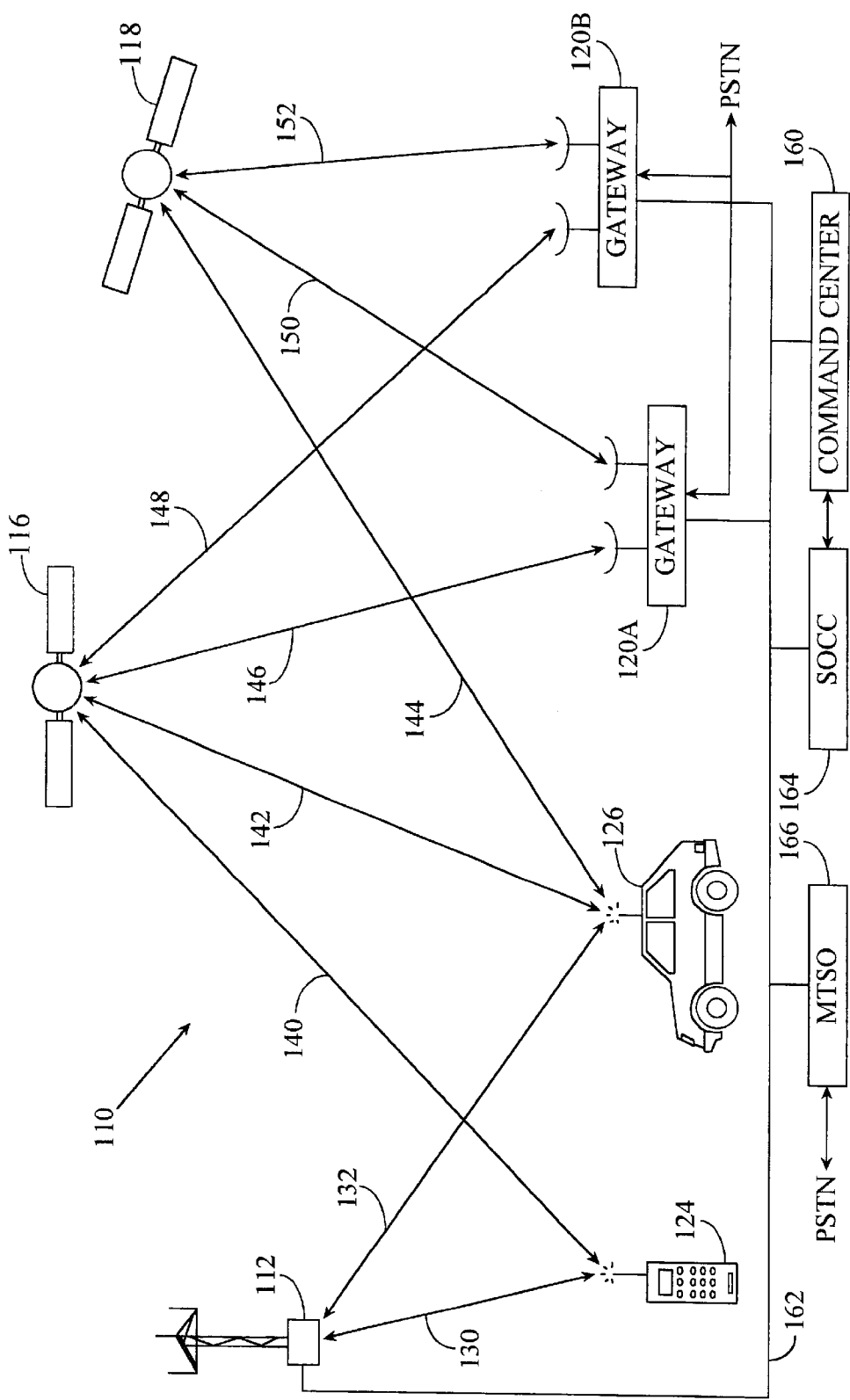
FIG. 1 illustrates an exemplary wireless communication system in which the present invention is useful.

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the present invention. The present invention could find use in a variety of wireless information and communication systems, including, but not limited to, satellite telephone systems. A preferred application is in code-division multiple access (CDMA) wireless spread spectrum satellite communication systems for mobile or portable telephone service.

The present invention is particularly suited for use in communication systems employing Low Earth Orbit satellites. However, as would be apparent to one skilled in the relevant arts, the concept of the present invention can also be applied to other types of satellite and terrestrial communication systems.

Typical satellite-based communication systems use base stations referred to as gateways, and one or more satellites to relay communication signals between the gateways and one or more user terminals. Gateways provide communication links from each user terminal to other user terminals or users of other connected communication systems, such as a PSTN (public switched telephone network). The user terminals can be fixed or mobile, such as a mobile telephone, and positioned near a gateway or remotely located.

Some satellite communication systems employ code division multiple access (CDMA) spread-spectrum signals, as disclosed in U.S. Pat. No. 4,901,307, issued Feb. 13, 1990, entitled "Spread Spectrum Multiple Access Communication System Using Satellite or Terrestrial Repeaters," and U.S. Pat. application Ser. No. 08/368,570, filed Jan. 4, 1995, entitled "Method and Apparatus For Using Full Spectrum Transmitted Power In A Spread Spectrum Communication System For Tracking Individual Recipient Phase Time And Energy," both of which are assigned to the assignee of the present invention, and are incorporated herein by reference.

In a typical spread spectrum communication system, one or more preselected pseudonoise (PN) code sequences are used to modulate or "spread" information signals over a predetermined spectral band prior to modulation onto a carrier signal for transmission as communication signals. PN code spreading, a method of spread spectrum transmission that is well known in the art, produces a signal for transmission that has a bandwidth much greater than that of the data signal. In a base station- or gateway-to-user communication link, PN spreading codes or binary sequences are used to discriminate between signals transmitted by different base stations or over different beams, as well as between multipath signals.

In a typical CDMA spread spectrum system, channelizing codes are used to discriminate between signals intended for different users within a cell or between user signals transmitted within a satellite sub-beam on a forward link (i.e., the signal path from the base station or gateway to the user terminal transceiver). Each user transceiver has its own orthogonal channel provided on the forward link by using a unique "channelizing" orthogonal code. Signals transferred on these channels are generally referred to as "traffic signals." Additional channels are provided for "paging," "synchronization," and other signals transmitted to system users. Walsh functions are generally used to implement the channelizing codes.

CDMA spread-spectrum communication systems, such as disclosed in the above patent documents, contemplate the use of coherent modulation and demodulation for forward link user terminal communication. In communication systems using this approach, a "pilot" carrier signal, also referred to as a "pilot signal," is used as a coherent phase reference for forward link signals. That is, a signal which contains no data modulation is transmitted by a gateway throughout a region of coverage as a reference.

Pilot signals are used by user terminals to obtain initial system synchronization and time, frequency, and phase tracking of other signals transmitted by the gateway. Phase information obtained from tracking a pilot signal carrier is used as a carrier phase reference for coherent demodulation of other system signals or traffic (data) signals. This technique allows many traffic signals to share a common pilot signal as a phase reference, providing for a less costly and more efficient tracking mechanism. A single pilot signal is typically transmitted by each gateway for each frequency used and shared by all user terminals receiving signals from that gateway on that frequency.

Gateways can convey information to user terminals using one or more signals known as paging signals or channels. For example, when a call has been placed to a particular mobile phone, the gateway alerts that mobile phone by means of a paging signal. Paging signals are used to designate the presence of a call, which traffic channel to use, and to also distribute system overhead information, along with user terminal specific messages. A communication system may have several paging signals. Synchronization signals can also be used to transfer system information useful to facilitate time synchronization. All of these signals act as shared resources in a manner similar to pilot signals.

User terminals can respond to a message on a paging signal by sending an access signal over a reverse link, (that is, the signal path from the user terminal to the base station or gateway transceiver). Access signals are also used by user terminals when they originate calls.

As with any communication system, the communication signals are received by the user terminal and downconverted into a baseband frequency for further processing. Once downconverted, the signals are processed digitally to detect the particular pilot signal or signals being received, and to demodulate associated paging, synchronization, and traffic signals. During demodulation, the PN spreading codes are applied to despread the signals and the channelizing codes correlated with the signals to provide data.

An exemplary wireless communication system in which the present invention is useful is illustrated in FIG. 1. It is contemplated that this communication system uses CDMA type communication signals, but this is not required by the present invention. In a portion of a communication system 100 illustrated in FIG. 1, one base station 112, two satellites 116 and 118, and two associated gateways 120A and 120B are shown for effecting communication with two remote user terminals 124 and 126. Typically, the base stations and satellites/gateways are components of separate communication systems, referred to as being terrestrial and satellite based, although, this is not necessary. The total number of base stations, gateways, and satellites in such systems depends on desired system capacity and other factors well understood in the art.

User terminals 124 and 126 each have or comprise a wireless communication device such as, but not limited to, a cellular telephone, a data transceiver, or a paging or position determination receiver, and can be hand-held or vehicle mounted as desired. Here, the user terminals are illustrated as hand-held telephones and mobile telephones, such as car phones. However, it is also understood that the teachings of the invention are applicable to fixed units where remote wireless service is desired, including 'inside' as well as 'open air' locations.

Generally, beams from satellites 116 and 118 cover different geographical areas in predefined patterns. Beams at different frequencies, also referred to as CDMA channels or 'sub-beams,' can be directed to overlap the same region. It is also readily understood by those skilled in the art that beam coverage or service areas for multiple satellites, or antenna patterns for multiple base stations, might be designed to overlap completely or partially in a given region depending on the communication system design and the type of service being offered, and whether space diversity is being achieved.

A variety of multi-satellite communication systems have been proposed with an exemplary system employing on the order of 48 or more satellites, traveling in eight different orbital planes in Low Earth Orbit (LEO) for servicing a large number of user terminals. However, those skilled in the art will readily understand how the teachings of the present invention are applicable to a variety of satellite system and gateway configurations, including other orbital distances and constellations.

In FIG. 1, some possible signal paths are illustrated for communications being established between user terminals 124 and 126 and base station 112, or through satellites 116 and 118, with gateways 120A and 120B. The base station-user terminal communication links. are illustrated by lines 130 and 132. The satellite-user terminal communication links between satellites 116 and 118 and user terminals 124 and 126 are illustrated by lines 140, 142, and 144. The gateway-satellite communication links between gateways 120A and 120B and satellites 116 and 118 are illustrated by lines 146, 148, 150, and 152. Gateways 120A and 120B, and base station 112, may be used as part of one-way or two-way communication systems or simply to transfer messages or data to user terminals 124 and 126.

As seen in FIG. 1, communication system 100 generally uses one or more system control centers and/or switching networks 160, also referred to as a Ground Operations and Control Center (GOCC) in satellite communications systems. System controller (GOCC) 160 typically includes interface and processing circuitry and software for implementing system-wide control for gateways, satellites, or base stations, to maintain system-wide traffic control and signal synchronization, such as for PN or orthogonal code allocation and timing. System controller 160 can also control general routing of telephone calls between PSINs and gateways, and user terminals. However, each gateway generally has a PSTN or similar interface for connection directly to such networks. Communication links 162 generally couple system controller 160 to various system gateways or base stations, and can be established using known techniques such as, but not limited to, dedicated telephone lines, optical fiber links, or microwave or dedicated satellite communication links.

Such command centers may include or operate in conjunction with a separate Satellite Operations and Control Center (SOCC) 164 which typically contains processors and software for implementing various satellite specific control functions, by issuing commands and information that is transferred through gateways or the GOCC to the various satellites as needed or desired. A GOCC and a SOCC generally function very closely together and are directly connected or linked to achieve a high level of resource allocation management and efficiency across the communication system.

As found in conventional cellular systems, a separate Mobile Telephone Switching Office (MTSO), or Base Station Controllers (BSCs) can also be employed within communication system 100 to affect various control and coordination functions. These centers usually connect the base stations to a PSTN as needed.

Figure 2:
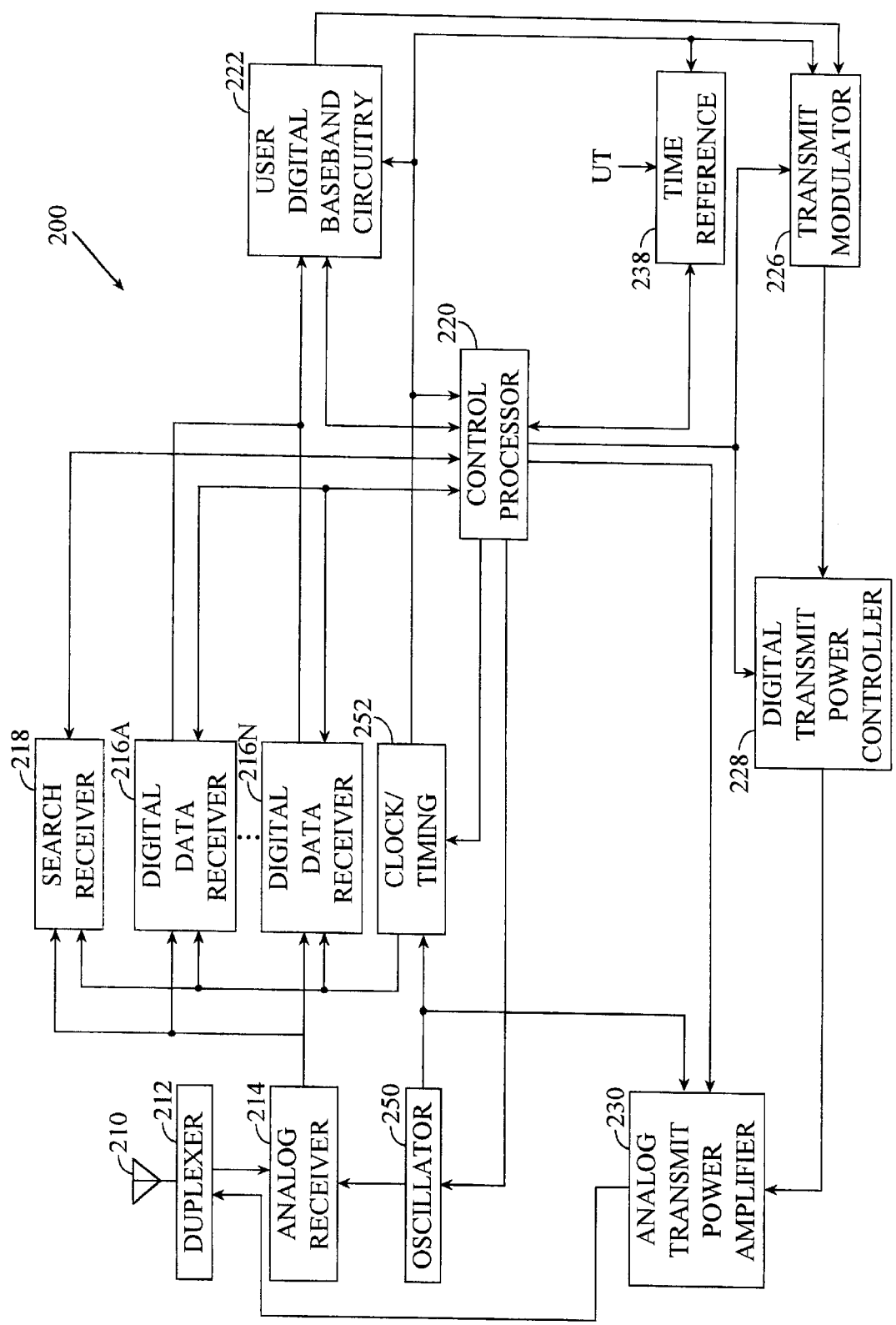
FIG. 2 illustrates an exemplary transceiver for use in a user terminal.

An exemplary transceiver 200 for use in a user terminal 106 is illustrated in FIG. 2. Transceiver 200 uses at least one antenna 210 for receiving communication signals which are transferred to an analog receiver 214, where they are downconverted, amplified, and digitized. A duplexer element 212 can be used to allow the same antenna to serve both transmit and receive functions. However, some systems employ separate antennas operating at different transmit and receive frequencies.

The digital communication signals output by analog receiver 214 are transferred to at least one digital data receiver 216A and at least one searcher receiver 218. Additional digital data receivers 216B–216N can be used to obtain desired levels of signal diversity, depending on the acceptable level of unit complexity, as would be apparent to one skilled in the relevant art.

At least one user terminal control processor 220 is coupled to digital data receivers 216A–216N and searcher receiver 218. Control processor 220 provides, among other functions, basic signal processing, timing, power and handoff control or coordination, and selection of frequency used for signal carriers. Another basic control function often performed by control processor 220 is the selection or manipulation of PN code sequences or orthogonal functions to be used for processing communication signal waveforms. Signal processing by control processor 220 can include a determination of relative signal strength and computation of various related signal parameters. Computations of signal parameters, such as timing and frequency, may include the use of additional or separate dedicated circuitry to provide increased efficiency or speed in measurements or improved allocation of control processing resources.

The outputs of digital data receivers 216A–216N are coupled to digital baseband circuitry 222 within the user terminal. User digital baseband circuitry 222 comprises processing and presentation elements used to transfer information to and from a user terminal. That is, signal or data storage elements, such as transient or long term digital memory; input and output devices such as display screens, speakers, keypad terminals, and handsets; A/D elements, vocoders and other voice and analog signal processing elements; and the like, all form parts of the user terminal baseband circuitry using elements well known in the art. If diversity signal processing is employed, user digital baseband circuitry 222 can comprise a diversity combiner and decoder. Some of these elements may also operate under the control of, or in communication with, control processor 220.

When voice or other data is prepared as an output message or communication signal originating with the user terminal, user digital baseband circuitry 222 is used to receive, store, process, and otherwise prepare the desired data for transmission. User digital baseband circuitry 222 provides this data to a transmit modulator 226 operating under the control of control processor 220. The output of transmit modulator 226 is transferred to a power controller 228 which provides output power control to a transmit power amplifier 230 for final transmission of the output signal from antenna 210 to a gateway.

Information or data corresponding to one or more measured signal parameters for received communication signals, or one or more shared resource signals, can be sent to the gateway using a variety of techniques known in the art. For example, the information can be transferred as a separate information signal or be appended to other messages prepared by user digital baseband circuitry 222. Alternatively, the information can be inserted as predetermined control bits by transmit modulator 226 or transmit power controller 228 under the control of control processor 220.

Digital receivers 216A–N and searcher receiver 218 are configured with signal correlation elements to demodulate and track specific signals. Searcher receiver 218 is used to search for pilot signals, or other relatively fixed pattern strong signals, while digital receivers 216A–N are used to demodulate other signals associated with detected pilot signals. Therefore, the outputs of these units can be monitored to determine the energy in or frequency of the pilot signal or other signals. These receivers also employ frequency tracking elements that can be monitored to provide current frequency and timing information to control processor 220 for signals being demodulated.

Figure 3:
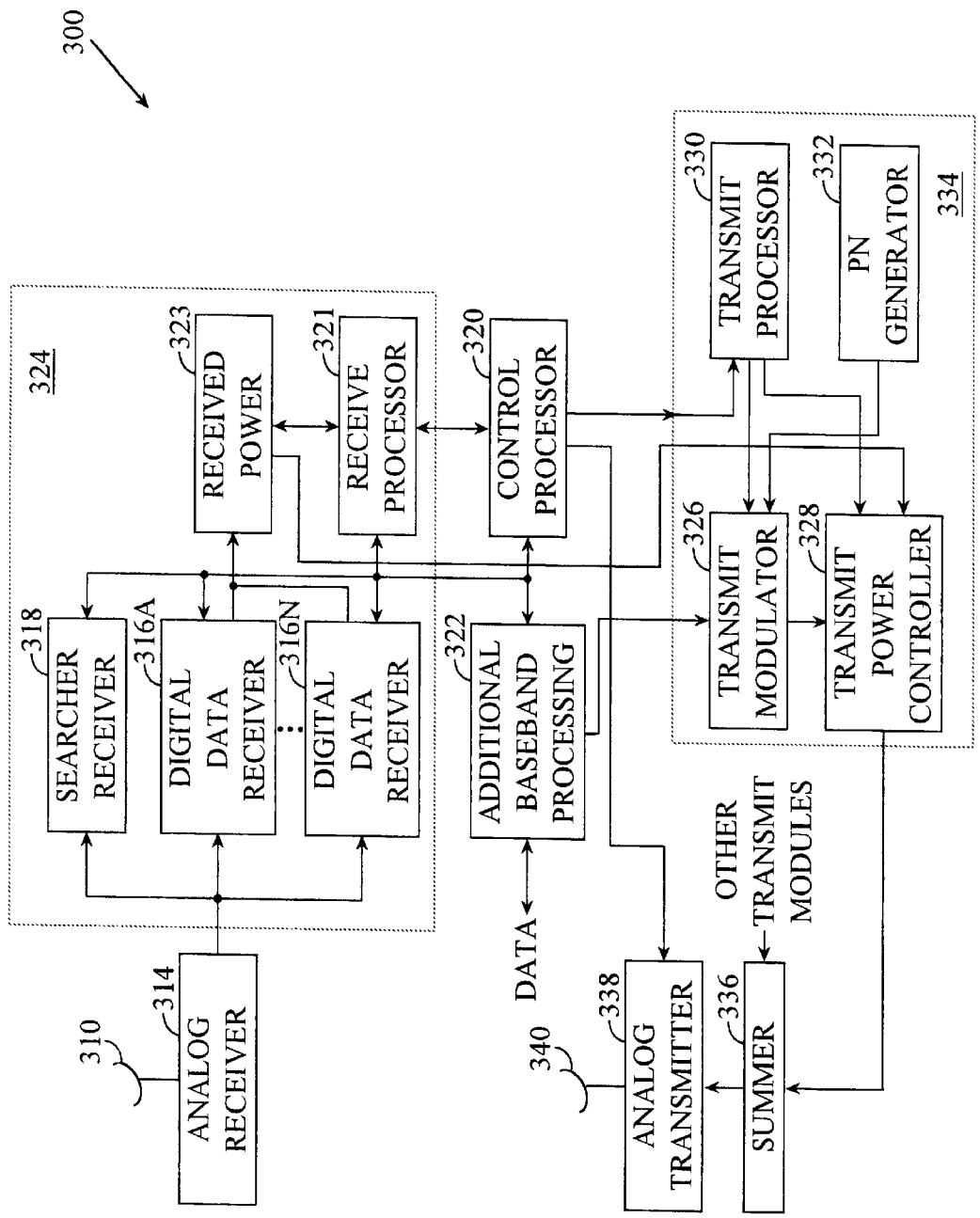
FIG. 3 illustrates an exemplary transmission and reception apparatus for use in a gateway.

An exemplary transmission and reception apparatus 300 for use in gateways 120A and 120B is illustrated in FIG. 3. The portion of gateways 120A, 120B illustrated in FIG. 3 has one or more analog receivers 314 connected to an antenna 310 for receiving communication signals which are then downconverted, amplified, and digitized using various schemes well known in the art. Multiple antennas 310 are used in some communication systems. Digitized signals output by analog receiver 314 are provided as inputs to at least one digital receiver module, indicated by dashed lines generally at 324.

Each digital receiver module 324 corresponds to signal processing elements used to manage communication between a gateway 120A, 120B and one user terminal 124, 126, although certain variations are known in the art. One analog receiver 314 can provide inputs for many digital receiver modules 324, and a number of such modules are typically used in gateways 102 to accommodate all of the satellite beams and possible diversity mode signals being handled at any given time. Each digital receiver module 324 has one or more digital data receivers 316 and a searcher receiver 318. Searcher receiver 318 generally searches for appropriate diversity modes of signals other than pilot signals. Where implemented in the communication system, multiple digital data receivers 316A–316N are used for diversity signal reception.

The outputs of digital data receivers 316 are provided to subsequent baseband processing elements 322 comprising apparatus well known in the art and not illustrated in further detail here. Exemplary baseband apparatus includes diversity combiners and decoders to combine multipath signals into one output for each user. Exemplary baseband apparatus also includes interface circuits for providing output data, typically to a digital switch or network. A variety of other known elements such as, but not limited to, vocoders, data modems, and digital data switching and storage components may form a part of baseband processing elements 322. These elements operate to control or direct the transfer of data signals to one or more transmit modules 334.

Signals to be transmitted to user terminals are each coupled to one or more appropriate transmit modules 334. A typical gateway uses a number of such transmit modules 334 to provide service to many user terminals 124, 126 at a time, and for several satellites and beams at a time. A base station may also use a number of such modules, although base stations tend to group transmit and receive functions more closely together in modem structures. The number of transmission modules 334 used by gateway 120 is determined by factors well known in the art, including system complexity, number of satellites in view, user capacity, degree of diversity chosen, and the like.

Each transmit module 334 includes a transmit modulator 326 which spread spectrum modulates data for transmission. Transmit modulator 326 has an output coupled to a digital transmit power controller 328, which controls the transmission power used for the outgoing digital signal. Digital transmit power controller 328 applies a minimum level of power for purposes of interference reduction and resource allocation, but applies appropriate levels of power when needed to compensate for attenuation in the transmission path and other path transfer characteristics. At least one PN generator 332 is used by transmit modulator 326 in spreading the signals. This code generation can also form a functional part of one or more control processors or storage elements used in gateway 120.

The output of transmit power controller 328 is transferred to a summer 336 where it is summed with the outputs from other transmit power control circuits. Those outputs are signals for transmission to other user terminals 124, 126 at the same frequency and within the same beam as the output of transmit power controller 328. The output of summer 336 is provided to an analog transmitter 338 for digital-to-analog conversion, conversion to the appropriate RF carrier frequency, further amplification and output to one or more antennas 340 for radiating to user terminals 124, 126. Antennas 310 and 340 may be the same antenna depending on the complexity and configuration of the system.

At least one gateway control processor 320 is coupled to receiver modules 324, transmit modules 334, and baseband circuitry 322; these units may be physically separated from each other. Control processor 320 provides command and control signals to effect functions such as, but not limited to, signal processing, timing signal generation, power control, handoff control, diversity combining, and system interfacing. In addition, control processor 320 assigns PN spreading codes, orthogonal code sequences, and specific transmitters and receivers for use in user communication.

Control processor 320 also controls the generation and power of pilot, synchronization, and paging channel signals, and their coupling to transmit power controller 328. The pilot channel is simply a signal that is not modulated by data, and may use a repetitive unchanging pattern or non-varying frame structure type input (pattern) into transmit modulator 326. That is, the orthogonal function, Walsh code, used to form the channel for the pilot signal generally has a constant value, such as all 1's or 0's, or a well known repetitive pattern, such as a structured pattern of interspersed 1's and 0's. This effectively results in transmitting only the PN spreading codes applied from PN generator 332.

While control processor 320 can be coupled directly to the elements of a module, such as transmit module 324 or receive module 334, each module generally comprises a module-specific processor, such as transmit processor 330 or receive processor 321, which controls the elements of that module. Thus, in a preferred embodiment, control processor 320 is coupled to transmit processor 330 and receive processor 321, as shown in FIG. 3. In this manner, a single control processor 320 can control the operations of a large number of modules and resources more efficiently. Transmit processor 330 controls generation of, and signal power for, pilot, synchronization, paging signals, and traffic channel signals, and their respective coupling to power controller 328. Receiver processor 321 controls searching, PN spreading codes, and timing for demodulation and monitoring received power.

Figure 4:
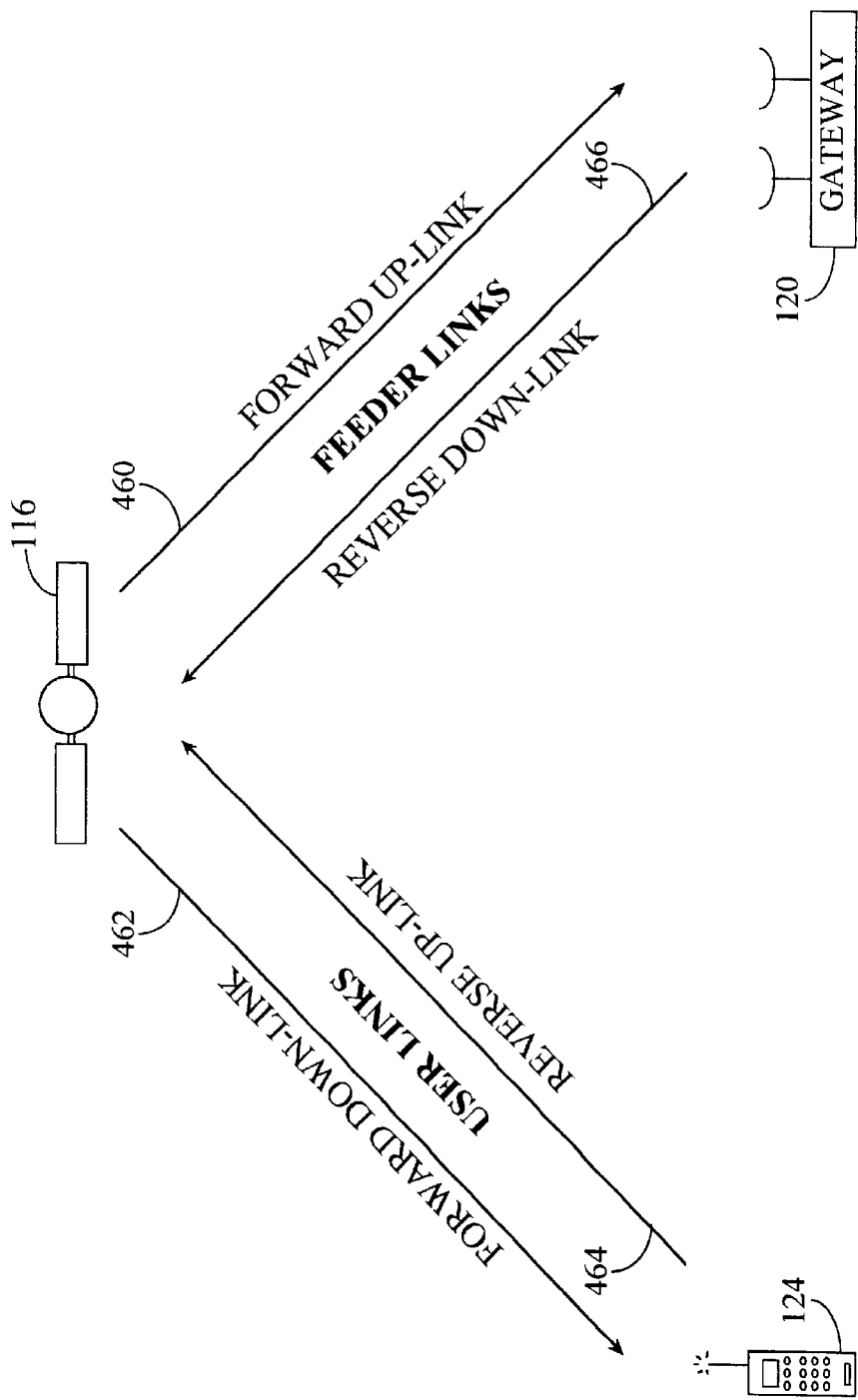
FIG. 4 provides additional details of the communication between a gateway and a user terminal.

FIG. 4 provides additional details of the communication between a gateway 120 and user terminal 124 of communication system 100. Communication links between gateway 120 and satellite 116 are termed "feeder links" and the links between user terminal 124 and satellite 116 are termed "user links." Communication proceeds in a "forward" direction from gateway 120 on forward uplink 460 and then down from satellite 116 to user terminal 124 on forward downlink 462. In a return or "reverse" direction, communication proceeds up from user terminal 124 to satellite 116 on reverse uplink 464 and then down from satellite 116 to gateway 120 on reverse downlink 466.

Figure 5:
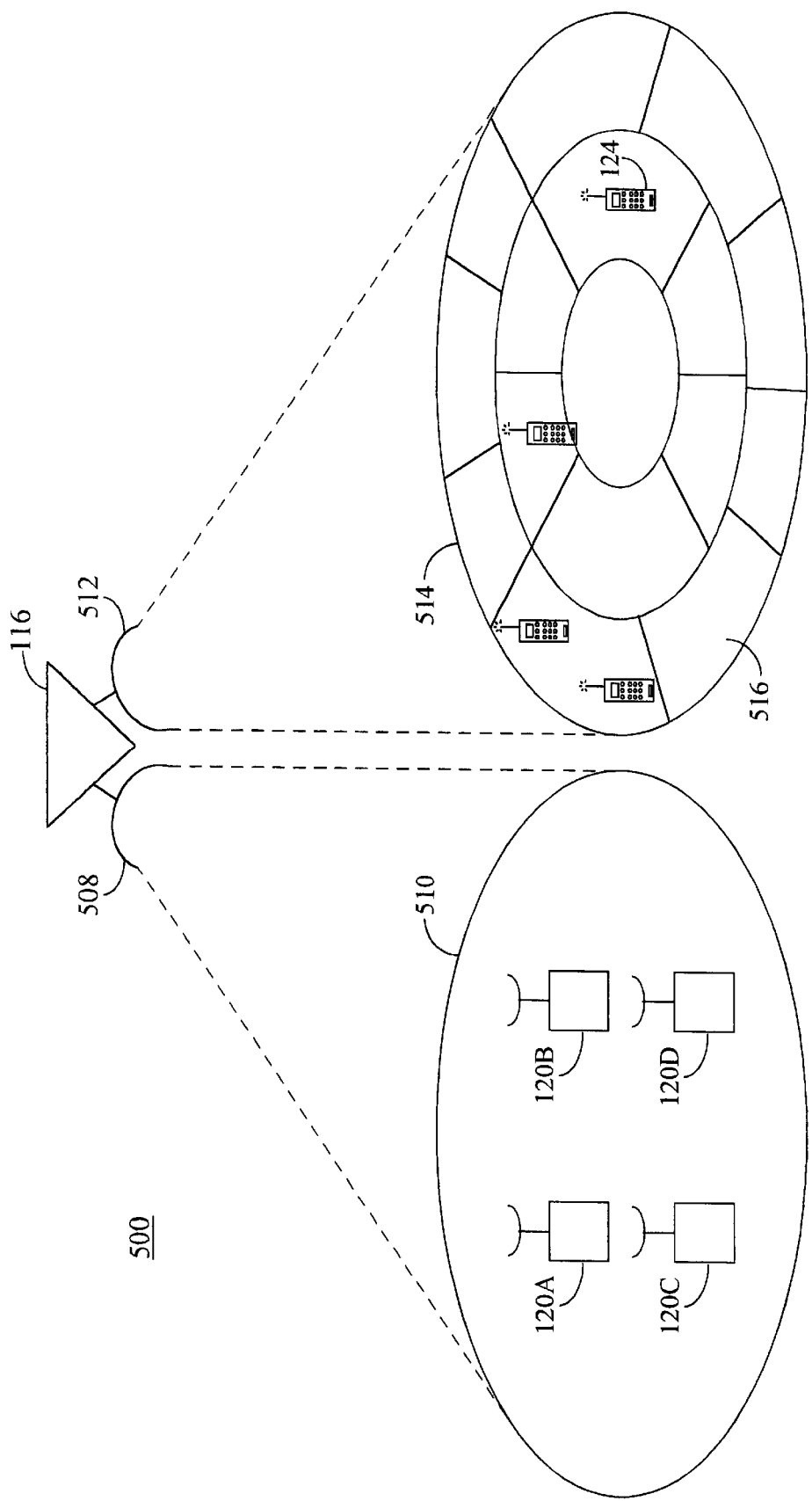
FIG. 5 depicts the beam patterns for the feeder and user links in a conventional satellite communication system.

FIG. 5 depicts exemplary beam patterns for the feeder and user links in a conventional satellite communication system 500. A variety of patterns are possible and it may be desirable to maintain different patterns for the feeder and user links. An example of alternate link beam patterns is shown in U.S. patent application Ser. No. 08/723,723, entitled "Ambiguity Resolution For Ambiguous Position Solutions Using Satellite Beams," filed Sep. 30, 1996, now allowed, and incorporated herein by reference. However, the beam patterns of the forward and reverse communications links can be the same without departing from the spirit and scope of the present invention.

As shown here, satellite 116 includes one feed link antenna 508 and at least one user link antenna 512. Feeder link antenna 508 produces a single feeder link "cell" or "superbeam" 510, which communicates with all of gateways 120 within that cell. Information is transmitted over the feeder link using techniques such as frequency division and polarization multiplexing. For example, the feeder link frequency band can be divided into several individual frequency "channels." The number of channels can be doubled through polarization reuse, for example, by using right-hand circular and left-hand circular polarization. For convenience, these channels are referred to herein as "feeder channels." In an exemplary system design, the feeder link contains 16 channels (or beams), each having a bandwidth of 16.5 MHz. Each of these beams is subdivided into 13 CDMA subchannels (or subbeams), each having a bandwidth of about 1.22 MHz. Thus, this type of feeder link supports 208 CDMA channels or subbeams.

The user links are spatially divided into multiple beams by user link antenna 512 of satellite 116 in both the forward and reverse directions, each using the full bandwidth of the user link. This spatial division results in a beam pattern, such as beam pattern 514 in FIG. 5, that includes multiple beams 516. The exemplary beam pattern 514 shown in FIG. 5 has 16 beams. However, those skilled in the art will recognize that more or less beams can be employed as desired according to various system features and designs. These beams are in many ways analogous to the cells of a terrestrial cellular system, and could be referred to as "cells."

The frequency band occupied by each beam can be subdivided into frequency-division multiple-access (FDMA) channels, also referred to as "sub-beams." Each sub-beam can be divided into multiple user channels through techniques that are well-known in the art, such as, but not limited to, using assigned time slots or orthogonal codes as discussed above. .

In such a system, each feeder channel corresponds to a beam, and thus to a cell 516 in user link beam pattern 514. For example, the communication signals exchanged with a particular user terminal 124 in a given cell 516 are exchanged with a gateway 120 over a corresponding feeder channel. Multiple gateways can also share a single satellite. For example, gateways can share a beam by allocating a subset of the sub-beams for use by each gateway.

Figure 6:
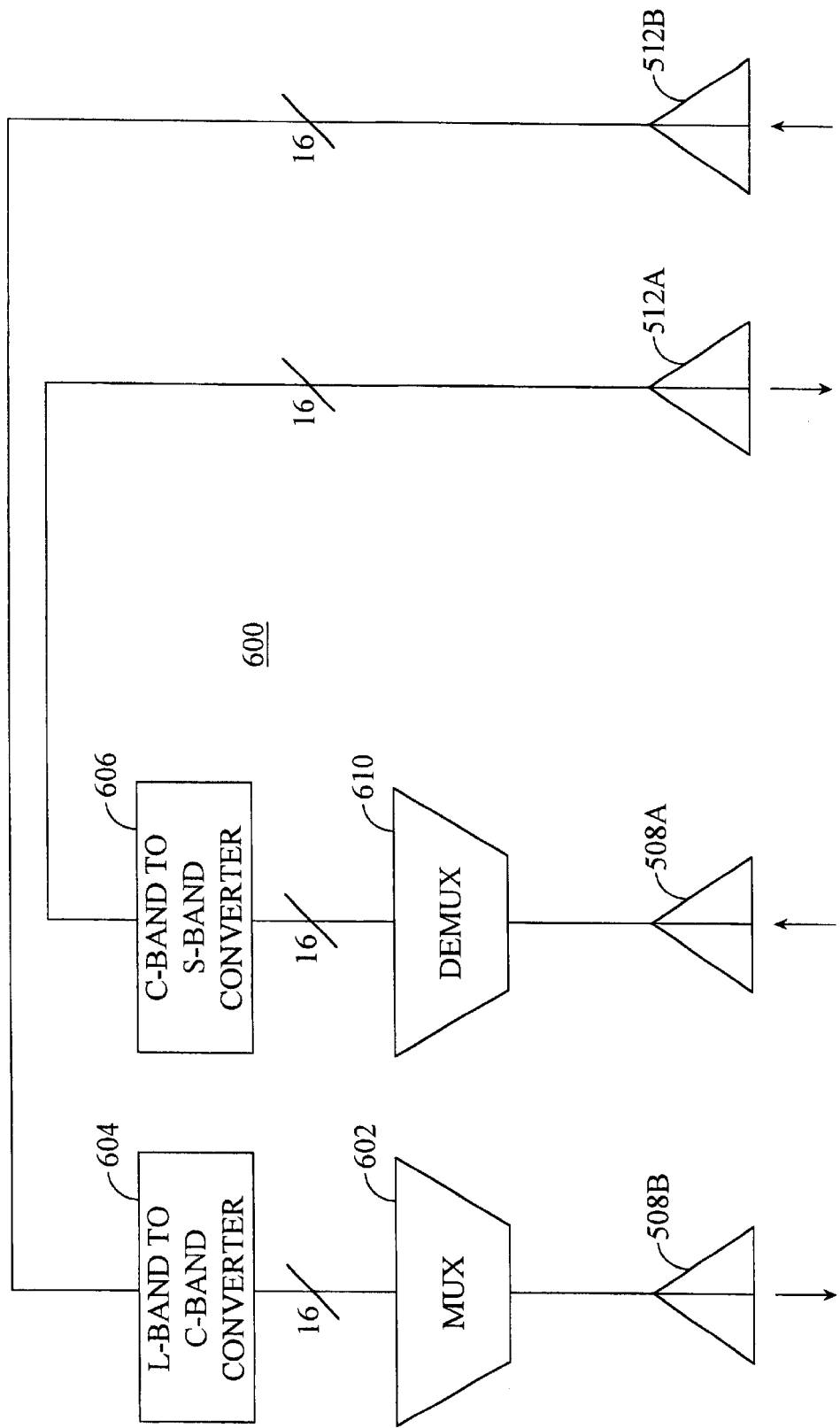
FIG. 6 is a block diagram of the internal transmission path of a conventional satellite.

FIG. 6 is a block diagram of the internal transmission path 600 of a conventional satellite 116. Transmission path 600 includes a forward transmission path and a reverse transmission path. For convenience, feeder link antenna 508 is shown as two antennas: forward uplink antenna 508A and reverse downlink antenna 508B. Likewise, user link antenna 512 is shown as two antennas: forward downlink antenna 512A and reverse uplink antenna 512B. Antenna 508A receives the forward uplink signal comprising 16 feeder channels. Demultiplexer 610 separates the signal into 16 transmission paths (16 beams), one for each feeder channel.

In a conventional system, the feeder links are at C-band and the forward downlink is at S-band. Converter 606 converts the signal on each forward transmission path from C-band to S-band. Forward downlink antenna 512A radiates the 16 signals as 16 separate beams to form beam pattern 514.

Antenna 512B receives the reverse uplink signal comprising the multiple beams, here 16 beams. In a conventional system, the reverse uplink is at L-band. Converter 604 converts the signal for each beam from L-band to C-band. Multiplexer 602 combines the signals (16) into one signal. Reverse downlink antenna 508B radiates the signal so as to illuminate cell 510.

As the demand for the services of such systems grows, it will be necessary to increase the capacity of the user links. One way to accomplish this is by adding additional cells 516 to beam pattern 514. The example system given above supports a total of 208 user link channels. The primary limitation on the amount of increase is complexity and cost. It may be desirable, and economically appropriate, to increase the user link capacity up to a certain point beyond which it is considered a matter of diminishing returns. In the example given above, it is thought that increasing the number of beams or cells by more than a factor of four would probably be unattractive to system operators or designers. In that case, the system would support 64 user link beams having a total of 832 channels. Of course, this increase in the total bandwidth of the user links requires a corresponding increase in the total bandwidth of the feeder links. However, the actual point beyond which this approach becomes uneconomical or undesirably complex varies with the system design, as will be known by those skilled in the art.

Figure 7:
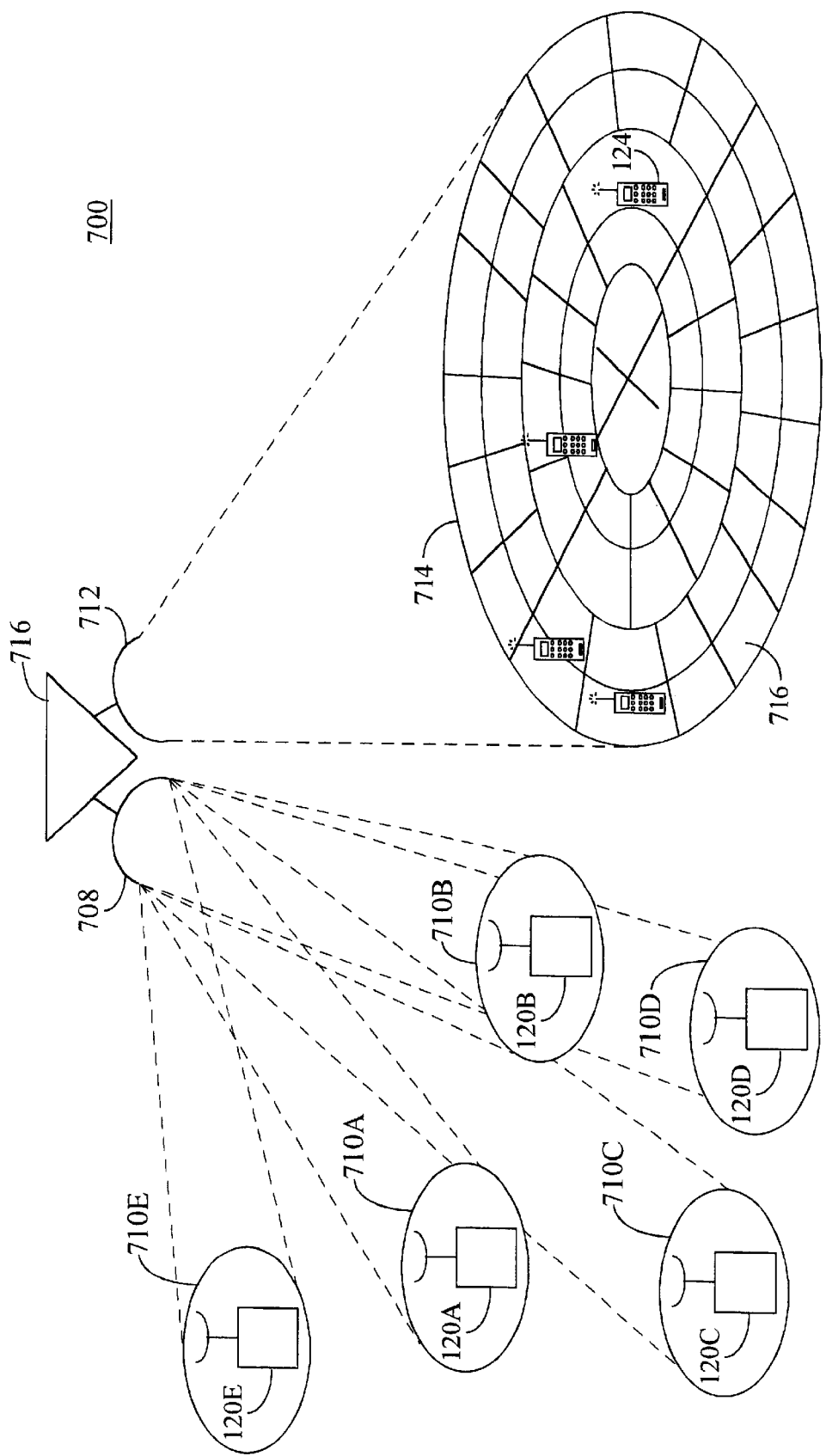
FIG. 7 depicts the beam patterns for the feeder and user links in a satellite communication system according to a preferred embodiment.

According to the present invention, additional bandwidth on the feeder links is provided by employing spatial multiplexing techniques and flexible FDMA channel assignment. FIG. 7 depicts exemplary beam patterns for the feeder and user links in a satellite communication system 700 constructed and operating according to the invention.

Referring to FIG. 7, satellite 716 is equipped with a feeder link antenna 708 that is capable of forming multiple beams to selectively illuminate multiple cells, each covering a gateway. Such beamforming antennas are well-known in the relevant art. These feeder link beams are called "pencil beams" because they are each narrower than the single beam of the conventional system, as exemplified in FIG. 5. In FIG. 7, five gateways are shown, each illuminated by a different beam of the feeder link. Gateway 120A is illuminated by beam or cell 710A, gateway 120B is illuminated by beam 710B, gateway 120C is illuminated by beam 710C, gateway 120D is illuminated by beam 710D, and gateway 120E is illuminated by beam 710E. Each beam can utilize the fill bandwidth of the feeder link.

In this example, there are a total of 1040 channels available (five pencil beams×16 beams per pencil beam×13 subbeams or "channels" per beam). The actual number of gateways that can be illuminated is a function of a number of factors, including the economics and complexity of controlling such a system. Typically, the system of this invention would have from three to five pencil beams, and the use of more pencil beams is considered economically unattractive or unnecessarily complex, at this time. In a system for which use of this invention is primarily intended, it is contemplated that a given satellite will see no more than about seven gateways at one time, depending on system design. Typically, two or more of these would be located on the fringe or edge of a satellite beam footprint. Design criteria would typically call for using enough pencil beams to cover about 75%–95% of the visible gateways, which is only around 3 or 4 in this situation.

In a preferred embodiment, the user link comprises 64 beams producing 64 cells 716 in beam pattern 714. As stated, the forward and reverse beam patterns can differ. Each beam comprises 13 sub-beams (FDMA channels) resulting in a total of 832 sub-beams for each satellite 116. Each sub-beam has a bandwidth of about 1.22 MHz; therefore, each beam has a bandwidth of 16.5 MHz. Each sub-beam can be divided into multiple user channels through techniques such as orthogonal Walsh modulation, M-ary orthogonal Walsh modulation, and simple interference sharing that are well-known in the art. Typically, the user downlink will be at S-band, and the user uplink is at L-band, although other frequency bands can clearly be used within the teachings of the present invention.

The feeder links comprise multiple feeder beams, each illuminating a different gateway. In the example shown, feeder link antenna 708 produces five feeder superbeams. Each feeder superbeam illuminates a gateway 120, as shown in FIG. 7. In the present example, each feeder superbeam occupies 200 MHz of C-band spectra. Through polarization reuse, that bandwidth is effectively doubled to 400 MHz, 200 MHz using left-hand circular polarization (LHCP) and 200 MHz using right-hand circular polarization (RHCP). Each polarization includes eight feeder beams for user traffic, for a total of 16 feeder beams for each feeder superbeam. The five feeder superbeams yield 80 feeder beams, each having 13 sub-beams or channels, for a total of 1040 or channels. In the example shown, five gateways support 64 user cells having a total of 832 user link sub-beams or channels.

The feeder link channels are mapped to the user link channels by hardware and instructions, commands, or software control in the GOCC (Gateway Operational Control Center) and the SOCC (Satellite Operational Control Center). That is, these centers can make determinations as to the desired or appropriate mapping, and provide commands to the gateways and satellites to implement the desired mapping arrangement. However, some of the control over allocating new feeder links can also reside in individual gateways to respond to traffic changes and loading, as desired. The channel mapping is preferably generally dynamic in nature, and can be changed at a given time to accommodate different traffic loads, patterns, or plans. In addition, since the number of feeder link channels need not be the same as the number of user link channels, some channels may not be used at any one time.

It should be understood that it is also possible to map multiple feeder link channels from the same or different gateways to the same user link channel or sub-beam. That is, the present invention allows gateways to share sub-beams in the mapping process to allow additional flexibility in allocating beam resources.

Figure 8:
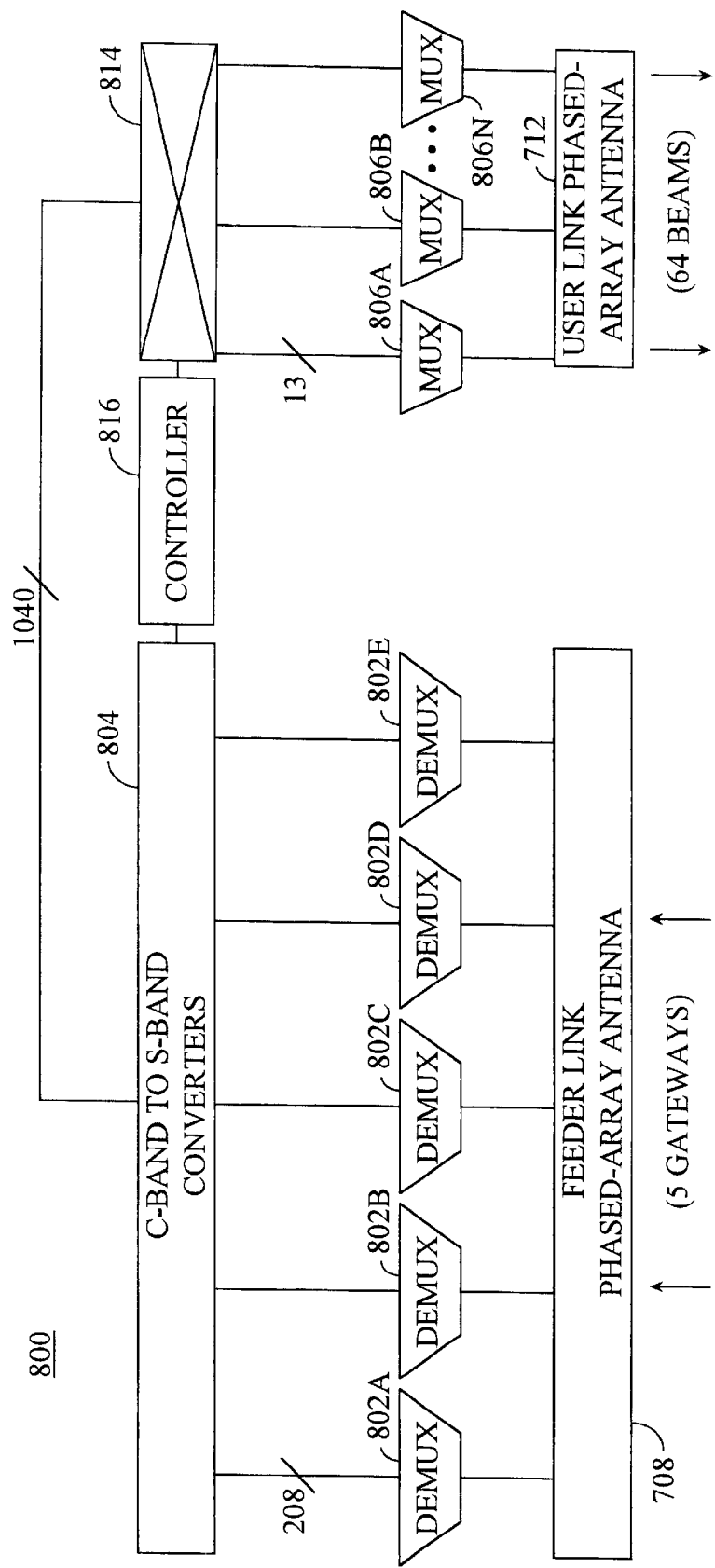
FIG. 8 is a block diagram of the internal forward transmission path of a communication satellite according to a preferred embodiment of the present invention.
Figure 9:
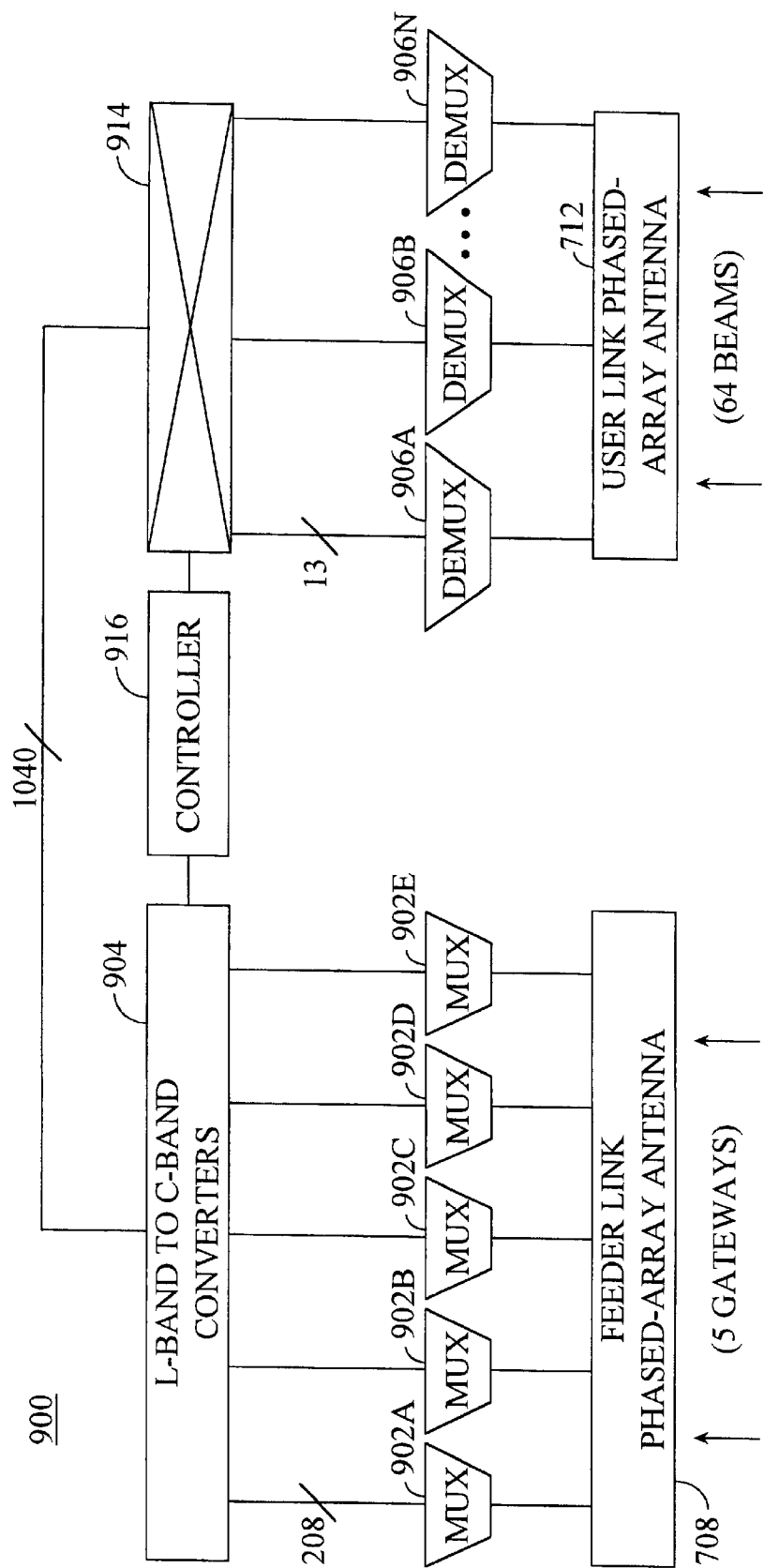
FIG. 9 is a block diagram of the internal reverse transmission path of a communication satellite according to a preferred embodiment of the present invention.

FIGS. 8 and 9 are block diagrams of the internal transmission paths of a communication satellite constructed and operating according to a preferred embodiment of the present invention. FIGS. 10, 11, 12, and 13 are flowcharts depicting the operation of the internal transmission paths according to a preferred embodiment of the present invention.

FIG. 8 is a block diagram of forward transmission path 800. Path 800 includes feeder link antenna 708, demultiplexers 802A–802E, C-band to S-band frequency converters 804, switch 814, multiplexers 806A–806N, user link antenna 712, and controller 816. Antennas 708 and 712 are typically implemented as phased-array type antennas, but other types of antennas or beam forming antenna assemblies can be used, as desired.

FIG. 9 is a block diagram of the reverse transmission path 900. Path 900 includes user link antenna 712, demultiplexers 906A–906N, switch 914, L-band to C-band converters 904, multiplexers 902A–902E, feeder link antenna 708, and controller 916.

Controllers 816 and 916 are implemented as commercially available general-purpose processors, although other implementations can be employed within the scope of the invention. In one embodiment, controllers 816 and 916 are implemented as a single processor.

Figure 10:
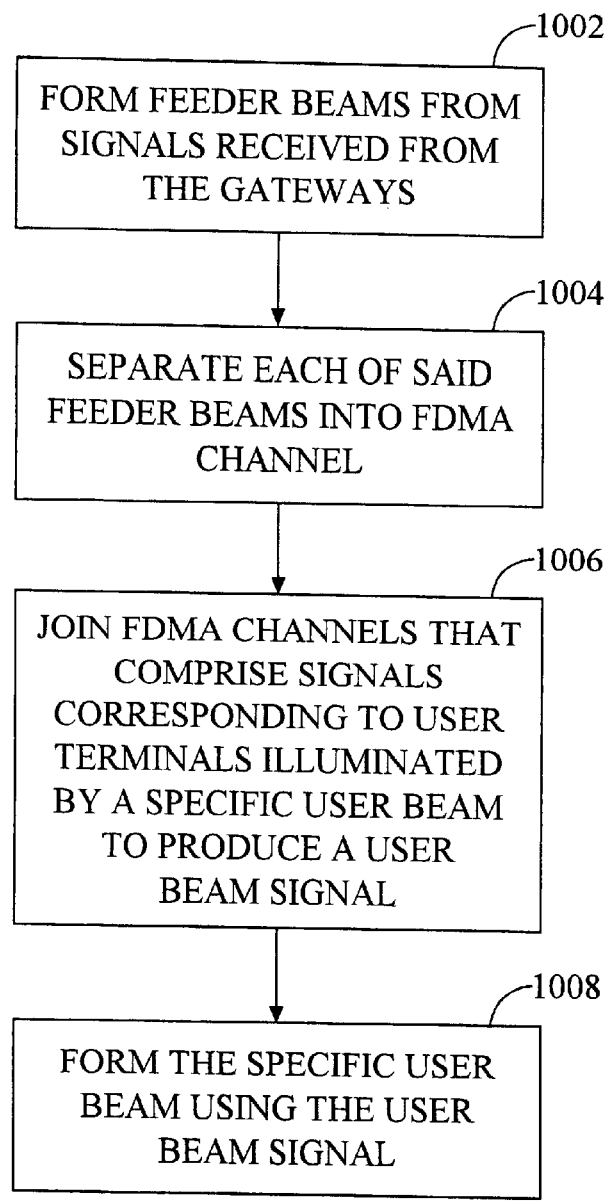
FIGS. 10, 11, 12 and 13 are flowcharts depicting the operation of the internal transmission paths, according to a preferred embodiment of the present invention.

The operation of forward path 800 is now described with reference to FIGS. 10 and 11. In the illustrated embodiment, antenna 708 illuminates up to five gateways 120, each with a separate feeder superbeam. Antenna 708 forms feeder superbeams using the signals received from the gateways so that a separate superbeam covers each gateway, as shown in step 1002. According to a typical ITU band allocation, each feeder superbeam is at C-band, occupying the frequency band between 6484 MHz and 6675.5 MHz. This band includes 16 frequency division multiplexed beams, referred to herein as "feeder beams", each having a bandwidth of 16.5 MHz. Eight of the feeder beams are polarized using right-hand circular polarization, and the other eight beams are polarized using left-hand circular polarization. Each feeder superbeam also includes a 20 MHz bandwidth command channel for transmitting commands to satellite 716, such as provided by SOCC 164 or GOCC 160.

The bandwidth of each feeder beam is divided into a series of frequency division multiple access (FDMA) channels, here 13, each having a bandwidth of about 1.22 MHz. Therefore, each feeder superbeam comprises 208 FDMA channels. Each feeder superbeam is routed to one of demultiplexers 802A–802E. Each demultiplexer 802 separates a feeder beam into its 208 constituent FDMA channels, as shown in step 1004.

The invention joins the FDMA channels that comprise signals corresponding to user terminals that are illuminated by a specific user beam, as shown in step 1006, and as described below in detail. This operation results in 64 user beam signals which are fed to user link antenna 712. Antenna 712 uses the 64 user beam signals to form 64 user beams 716, as shown in step 1008.

One advantage of the present invention is that any FDMA channel received from a gateway can be routed to any of the 64 user beams produced by user link antenna 712. This routing is accomplished by multiplexers 806, and by converters such as C-band to S-band converters 804, and switch 814, which operate under the control of controller 816. In a preferred embodiment, controller 816 operates according to commands transmitted by the gateways over the command feeder channel.

Figure 11:
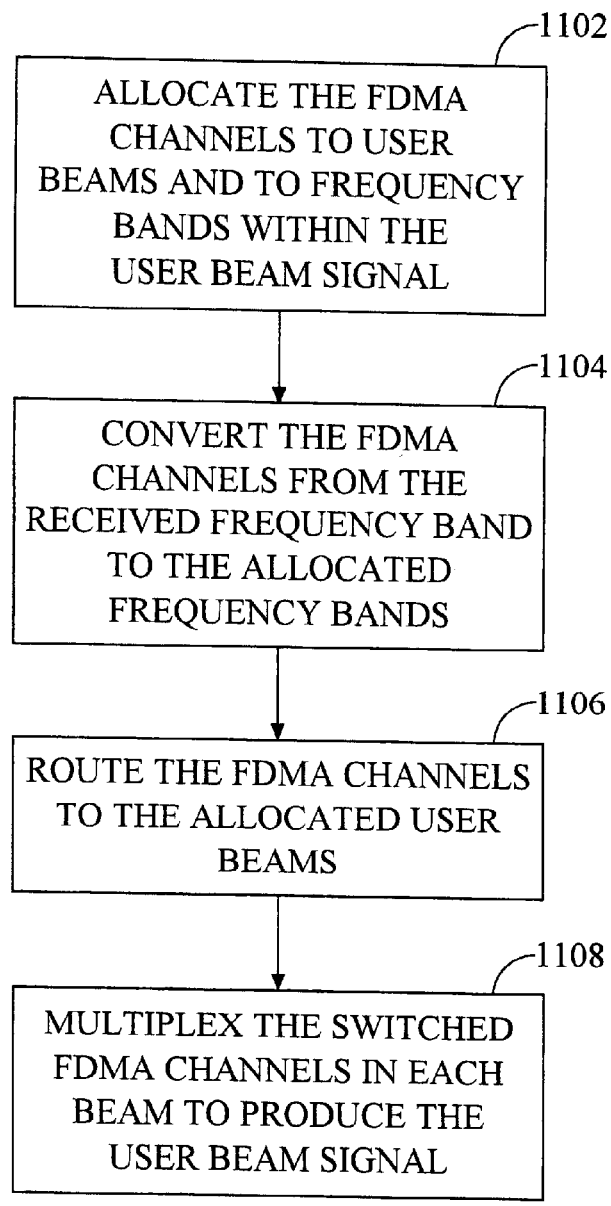

FIG. 11 is a flowchart detailing the operation of the present invention in routing FDMA channels received from the gateways to the corresponding user beams. This operation corresponds to step 1006 in FIG. 10.

As described above with reference to the example shown in FIG. 7, footprint 714 includes 64 user beams 716. Each user beam includes thirteen FDMA channels, each a different 1.22 MHz segment of the 16.5 MHz bandwidth of the user beam. The forward user link is at S-band, occupying the frequency range from 2483.5 MHz to 2500 MHz. Thus, the first step in routing an FDMA channel from a gateway beam to a user beam is to allocate each FDMA channel to a particular frequency band within the S-band segment occupied by the user downlink. This allocation is made by controller 816 in accordance with commands received from the gateways, as shown in step 1102.

The frequency conversion is performed by C-band to S-band converters 804 under the operation of controller 816, as shown in step 1104, according to techniques well-known in the relevant arts. In the illustrated embodiment, C-band to S-band converters 804 comprise 1040 individual frequency converters, one for each FDMA channel. The frequency-converted FDMA channels are then fed to switch 814. However, some time sharing of such resources may be allowed in some configurations reducing this total number of converters.

As can be seen from the foregoing, the feeder link may support 1040 channels when five gateways are illuminated by a satellite with five feeder superbeams. In the illustrated embodiment, there are 64 user link beams, which support 832 user link channels. This means that, in this example, some feeder link channels are not utilized to form user link channels. In another embodiment which uses four feeder superbeams and four user link beams, the number of feeder link channels is the same as the number of user link channels. And in a third example, the number of feeder link superbeams may be less than the number of user link beams. In that event, all of the feeder link channels would be mapped to fewer than all of the user link channels. As noted elsewhere, the channel mapping is generally carried out under the command or control of GOCC 160 and SOCC 164 through controllers 816 and 916.

In a preferred embodiment, the frequency coverted FDMA channels are combined in the user link as follows: the first 13 FDMA channels are combined in MUX 806A to form a first user link beam, the second 13 FDMA channels are combined in MUX 806B to form a second user link beam, etc., until MUX 806N combines the last available 13 FDMA channels to form the Nth (typically 64th) user link beam.

Switch 814 routes a group of 13 FDMA channels to each of multiplexers 806A–806N under the control of controller 816, as shown in step 1106. In the examplary embodiment, there are 64 user beams, and, therefore, 64 multiplexers 806. Each multiplexer 806 combines 13 received FDMA channels into a single signal, referred to herein as a "user beam signal," as shown in step 1108. As described above, the 64 user beam signals are passed to user link phased-array antenna 712 to generate user beams for transmission to the user terminals.

Figure 12:
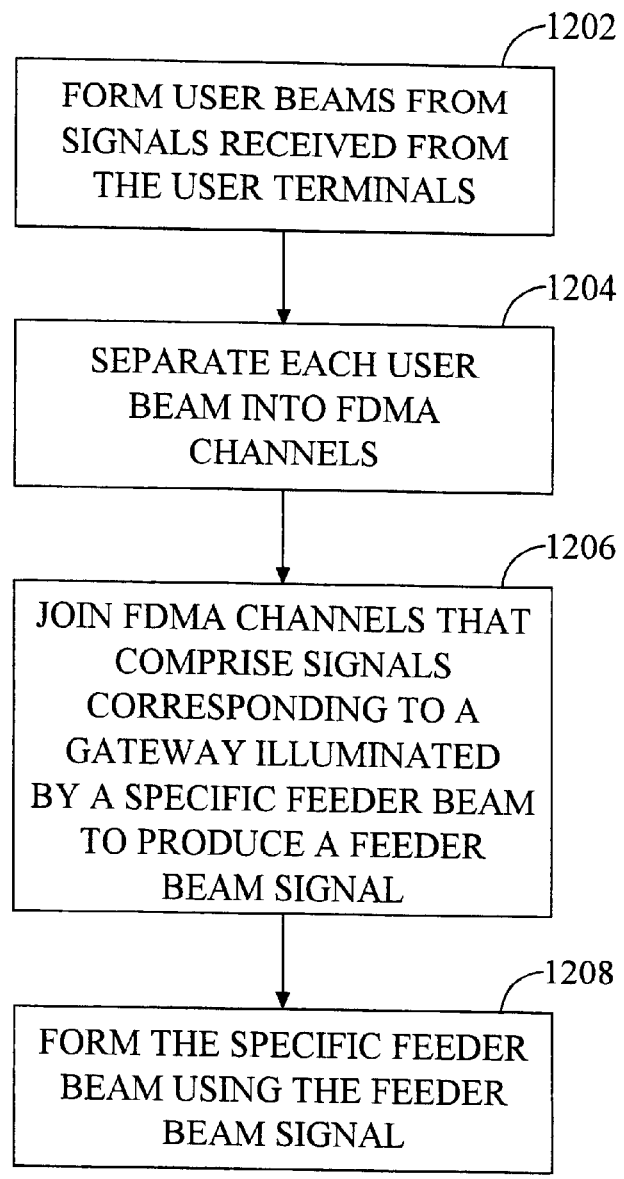
Figure 13:
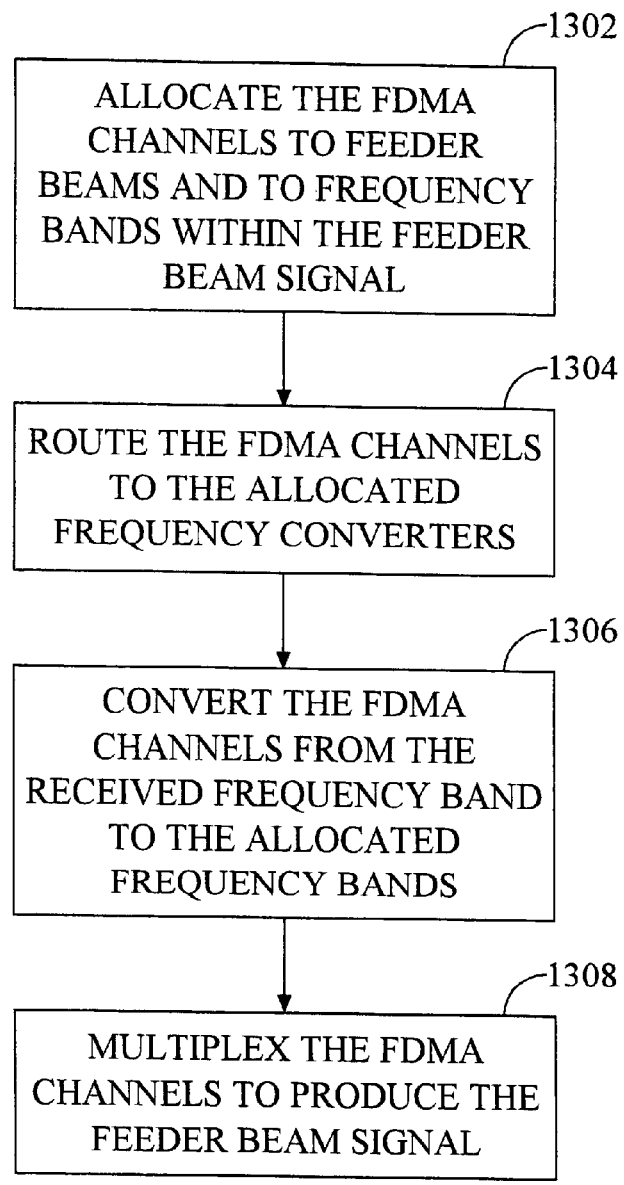

The operation of reverse path 900 is now described, with reference to FIGS. 12 and 13. Antenna 712 forms user beams using the signals received from user terminals within footprint 714 so that a separate beam covers each cell 716, as shown in step 1202. In a preferred embodiment, each user beam is at L-band, occupying the frequency band between 1610 MHz and 1626.5 MHz.

Each user beam is routed to one of demultiplexers 906A–906N; in the exemplary embodiment, N=64. The bandwidth of each user beam is divided into thirteen frequency division multiple access (FDMA) channels, each having a bandwidth of about 1.22 MHz. Each demultiplexer 906 separates a user beam into its thirteen constituent FDMA channels, as shown in step 1204.

As mentioned above, one advantage of the present invention is that any FDMA channel received on any user beam can be routed to any of the gateways, here five. This routing is accomplished by multiplexers 906, and by L-band to C-band converters 904 and switch 914, which operate under the control of controller 916. In a preferred embodiment, controller 916 operates according to commands transmitted by the gateways over the command feeder channel.

In the reverse link operation, antenna 712 receives signals on the 64 user link beams. Demultiplexers 906 separate each of the 13 reverse user link channels from each reverse user link beam. The 832 reverse user link channels are applied to switch 914. Under the control of controller 916, the reverse user link channels are mapped onto the 1040 reverse feeder link channels and applied to L-Band to C-Band converters 904. The frequency converted feeder link channels are then multiplexed in respective MUXes 902 into five reverse feeder link superbeams which are transmitted by antenna 708 to gateways 710.

Thus, the invention joins the FDMA channels that comprise signals corresponding to a specific feeder beam that illuminates a specific gateway, as shown in step 1206, and as described in detail below. This operation results in five feeder link superbeam signals which are fed to feeder link antenna 708. Antenna 708 uses the superbeams to form five feeder beams, as shown in step 1208.

Routing of FDMA channels received from the user terminals to the corresponding gateways will now be described with reference to FIG. 13 which is a flowchart detailing the operation of the present invention in routing FDMA channels received from the user terminals to the corresponding gateways. This operation corresponds to step 1206 in FIG. 12.

As shown in FIG. 7, footprint 714 includes 64 user beams 716. Each user beam includes thirteen FDMA channels, here each occupies a different approximately 1.22 MHz segment of the 16.5 MHz bandwidth of the user beam. The reverse feeder link is at C-band, occupying the frequency range from 5158.5 MHz to 5350 MHz. Thus, the first step in routing an FDMA channel from a user beam to a gateway beam is to allocate each FDMA channel to a particular frequency band within the C-band segment occupied by the feeder downlink. This allocation is made by controller 916 in accordance with commands received from the gateways, as shown in step 1302.

Switch 914, under the control of controller 916, routes each FDMA channel to L-band to C-band converters 904, as shown in step 1304. The frequency conversion is performed by L-band to C-band converters 904 under the operation of controller 916, as shown in step 1306, according to techniques well-known in the relevant arts. In a preferred embodiment, L-band to C-band converters 904 comprise 1040 individual frequency converters, one for each FDMA channel.

A group of 208 FDMA channels is fed to each of multiplexers 902A–902E. Each multiplexer 902 combines the 208 received FDMA channels into a single signal, referred to herein as a "feeder beam signal," as shown in step 1308. As described above, the five feeder beam signals are passed to feeder link phased-array antenna 708 to generate feeder superbeams for transmission to the gateways.

The foregoing description is provided to enable any person skilled in the art to make and use the present invention. Various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

What I claim as my invention is:

1. An apparatus for use in a satellite communication system including a plurality of gateways, a satellite, and a plurality of user terminals, comprising:
    a beamforming feeder link antenna that forms a plurality of feeder beams from signals received from the gateways, each feeder beam illuminating one of the gateways and including a plurality of frequency division multiple access (FDMA) channels;
    a plurality of demultiplexers that separate each of said feeder beams into said FDMA channels;
    means, including first and second frequency converters to frequency-convert corresponding first and second ones of said plurality of demultiplexed FDMA channels to corresponding first and second frequency-converted FDMA channels, for combining said first frequency-c converted FDMA channel with said second frequency-converted FDMA channel, said first and second frequency-converted FDMA channels comprising signals corresponding to user terminals illuminated by a specific user beam, to produce a user beam signal; and
    a beamforming user link antenna that forms said specific user beam using said user beam signal.

2. The apparatus of claim 1, wherein said user beam signal includes a plurality of frequency bands, and wherein said means for combining comprises:
    a controller that allocates said first and second FDMA channels to said specific user beam and to first and second ones of the user beam signal frequency bands,
    said first frequency converter being adapted to convert said first FDMA channel from the frequency band on which said first FDMA channel was received to said first one of the user beam signal frequency bands, and
    said second frequency converter being adapted to convert said second FDMA channel from the frequency band on which said second FDMA channel was received to said second one of the user beam signal frequency bands; and
    a multiplexer that multiplexes said frequency-converted first and second FDMA channels to produce said user beam signal.

3. The apparatus of claim 2, wherein said means for combining further comprises:
    a switch that routes said frequency-converted first and second FDMA channels to said multiplexer.

4. The apparatus of claim 1, wherein said means for combining includes a plurality of individual frequency converters, each of the individual frequency converters for frequency-converting a respective one of the plurality of demultiplexed FDMA channels.

5. The apparatus of claim 4, wherein said plurality of individual frequency converters are time-shared between the plurality of demultiplexed FDMA channels.

6. A method for use in a satellite communication system including a plurality of gateways, a satellite, and a plurality of user terminals, comprising the steps of:
    (a) forming a plurality of feeder beams from signals received from the gateways, each feeder beam illuminating one of the gateways and including a plurality of frequency division multiple access (FDMA) channels;
    (b) separating each of said feeder beams into said FDMA channels;
    (c) frequency converting first and second ones of said plurality of separated FDMA channels to corresponding first and second frequency-converted FDMA channels;
    (d) combining said first frequency-converted FDMA channel with said second frequency-converted FDMA channel, said first and second frequency-converted FDMA channels comprising signals corresponding to user terminals illuminated by a specific user beam, to produce a user beam signal; and
    (e) forming said specific user beam using said user beam signal.

7. The method of claim 6, wherein said user beam signal includes a plurality of frequency bands, and wherein step (d) comprises the further steps of:
    (f) allocating said first and second FDMA channels to first and second ones of the user beam signal frequency bands; and
    (g) multiplexing said frequency-converted first and second FDMA channels to produce said user beam signal.

8. The method of claim 7, wherein step (c) comprises the steps of:

converting said first FDMA channel from the frequency band on which said first FDMA channel was received to said first one of the user beam signal frequency bands; and converting said second FDMA channel from the frequency band on which said second FDMA channel was received to said second one of the user beam signal frequency bands.

9. An apparatus for use in a satellite communication system including a plurality of gateways, a satellite, and a plurality of user terminals, comprising:

a user link beamforming antenna that forms a plurality of user beams from signals received from the user terminals, each user beam including a plurality of frequency division multiple access (FDMA) channels;

a plurality of demultiplexers that separate each of said user beams into said FDMA channels;

means, including first and second frequency converters to frequency convert corresponding first and second ones of said plurality of demultiplexed FDMA channels to corresponding first and second frequency-converted FDMA channels, for combining said first frequency-converted FDMA channel with said second frequency-converted FDMA channel, said first and second frequency-converted FDMA channels comprising signals corresponding to a gateway illuminated by a specific feeder beam, to produce a feeder beam signal; and a user link beamforming antenna that forms said specific feeder beam using said feeder beam signal.

10. The apparatus of claim 9, wherein said feeder beam signal includes a plurality of frequency bands, and wherein said means for combining comprises:

a controller that allocates said first and second FDMA channels to said specific feeder beam and to said first and second ones of the feeder beam signal frequency bands, said first frequency converter being adapted to convert said first FDMA channel from the frequency band on which said first FDMA channel was received to said first one of the feeder beam signal frequency bands, and said second frequency converter being adapted to convert said second FDMA channel from the frequency band on which said second FDMA channel was received to said second one of the feeder beam signal frequency bands; and a multiplexer that multiplexes aid frequency-converted first and second FDMA channels to produce said feeder beam signal.

11. The apparatus of claim 10, wherein said means for combining further comprises:

a switch that routes said first FDMA channel to said first frequency converter and that routes said second FDMA channel to said second frequency converter.

12. The apparatus of claim 9, wherein said means for combining includes a plurality of individual frequency converters, each of the individual frequency converters for frequency-converting a respective one of the plurality of demultiplexed FDMA channels.

13. The apparatus of claim 12, wherein said plurality of individual frequency converters are shared between the plurality of demultiplexed FDMA channels.

14. A method for use in a satellite communication system including a plurality of gateways, a satellite, and a plurality of user terminals, comprising the steps of:

(a) forming a plurality of user beams from signals received from the user terminals, each user beam including a plurality of frequency division multiple access (FDMA) channels;

(b) separating each of said user beams into said FDMA channels;

(c) frequency converting first and second ones of said plurality of separated FDMA channels to corresponding first and second frequency-converted FDMA channels;

(d) combining said first frequency-converted FDMA channel with said second frequency-converted FDMA channel, said first and second frequency-converted FDMA channels comprising signals corresponding to a gateway illuminated by a specific feeder beam, to produce a feeder beam signal; and (e) forming said specific feeder beam using said feeder beam signal.

15. The method of claim 14, wherein said feeder beam signal includes a plurality of frequency bands, and wherein step (d) comprises the further steps of:

(f) allocating said first and second FDMA channels to first and second ones of the feeder beam signal frequency bands; and (g) multiplexing said frequency-converted first and second FDMA channels to produce said feeder beam signal.

16. The method of claim 15, wherein step (c) comprises the steps of:

converting said first FDMA channel from the frequency band on which said first FDMA channel was received to said first one of the feeder beam signal frequency bands; and converting said second FDMA channel from the frequency band on which said second FDMA channel was received to said second one of the feeder beam signal frequency bands.

* * * * *